United States Patent
Hartnett et al.

(10) Patent No.: US 11,851,083 B2
(45) Date of Patent: Dec. 26, 2023

(54) METHODS AND SYSTEM FOR CONSTRUCTING DATA REPRESENTATION FOR USE IN ASSISTING AUTONOMOUS VEHICLES NAVIGATE INTERSECTIONS

(71) Applicant: Argo AI, LLC, Pittsburgh, PA (US)

(72) Inventors: Andrew T. Hartnett, West Hartford, CT (US); G. Peter K. Carr, Allison Park, PA (US); Constantin Savtchenko, Sewickley, PA (US); Greydon Foil, Pittsburgh, PA (US); Matthew L. Gilson, Pittsburgh, PA (US); William Tyler Krampe, Sewickley, PA (US)

(73) Assignee: Argo AI, LLC, Pittsburgh, PA (US)

( * ) Notice: Subject to any disclaimer, the term of this patent is extended or adjusted under 35 U.S.C. 154(b) by 183 days.

(21) Appl. No.: 17/147,582

(22) Filed: Jan. 13, 2021

(65) Prior Publication Data
US 2022/0219720 A1 Jul. 14, 2022

(51) Int. Cl.
*G06F 18/23* (2023.01)
*B60W 60/00* (2020.01)
(Continued)

(52) U.S. Cl.
CPC ....... *B60W 60/001* (2020.02); *G01C 21/3461* (2013.01); *G01C 21/367* (2013.01);
(Continued)

(58) Field of Classification Search
CPC ........... B60W 60/001; B60W 2552/53; B60W 2552/10; B60W 2420/403; G06V 20/588;
(Continued)

(56) References Cited

U.S. PATENT DOCUMENTS

| 7,363,126 B1 * | 4/2008 | Zhong | G01C 21/3484 |
| | | | 701/25 |
| 9,248,834 B1 * | 2/2016 | Ferguson | B60W 50/0097 |

(Continued)

FOREIGN PATENT DOCUMENTS

| JP | 2020187551 | * 11/2020 |
| WO | 2021003452 A1 | 1/2021 |

OTHER PUBLICATIONS

Zhengbing He, Network-wide identification of turn-level intersection congestion using only low-frequency probe vehicle data, Oct. 11, 2019, Transportation Research Part C 108 (Year: 2019).*

(Continued)

*Primary Examiner* — Elaine Gort
*Assistant Examiner* — Matthias S Weisfeld
(74) *Attorney, Agent, or Firm* — Fox Rothschild LLP

(57) ABSTRACT

A system receives a road network map that corresponds to a road network that is in an environment of an autonomous vehicle. For each of the one or more lane segments, the system identifies one or more conflicting lane segments from the plurality of lane segments, each of which conflicts with the lane segment, and adds conflict data pertaining to a conflict between the lane segment and the one or more conflicting lane segments to a set of conflict data. The system analyzes the conflict data to identify a conflict cluster that is representative of an intersection. The system groups predecessor lane segments and the successor lane segments as inlets or outlets of the intersection, generates an outer geometric boundary of the intersection, generates an inner geometric boundary of the intersection, creates a data representation of the intersection and adds the data representation to the road network map.

15 Claims, 11 Drawing Sheets

(51) Int. Cl.
*G01C 21/36* (2006.01)
*G01C 21/34* (2006.01)
*G06V 20/56* (2022.01)

(52) U.S. Cl.
CPC ............ *G06F 18/23* (2023.01); *G06V 20/588* (2022.01); *B60W 2420/403* (2013.01); *B60W 2552/10* (2020.02); *B60W 2552/53* (2020.02)

(58) Field of Classification Search
CPC . G01C 21/3461; G01C 21/367; G06K 9/6218
USPC .......................................................... 701/23
See application file for complete search history.

(56) References Cited

U.S. PATENT DOCUMENTS

| | | | |
|---|---|---|---|
| 10,545,029 | B2 | 1/2020 | Yang et al. |
| 2007/0225910 | A1* | 9/2007 | Fujiwara ............ G01C 21/3605 701/425 |
| 2014/0244161 | A1* | 8/2014 | Strassenburg-Kleciak .................. G01C 21/3826 707/793 |
| 2018/0224289 | A1* | 8/2018 | Pollock ................ G09B 29/106 |
| 2019/0236948 | A1 | 8/2019 | Wang et al. |
| 2019/0318620 | A1* | 10/2019 | Yang ..................... G08G 1/0133 |
| 2019/0347493 | A1* | 11/2019 | Chen .................. G01C 21/3815 |
| 2021/0192939 | A1* | 6/2021 | Vassilovski ...... G08G 1/096791 |

OTHER PUBLICATIONS

Signalized Intersections: Informational Guide, Aug. 2004, Federal Highway Administration (Year: 2004).*

Scrapper, C. et al., "Using a Priori Data for Prediction and Object Recognition in an Autonomous Mobile Vehicle," Proc. SPIE 5083, Unmanned Ground Vehicle Technology V, (30 Sep. 2003) available at https://www.spiedigitallibrary.org/conference-proceedings-of-spie/5083/0000/Using-a-priori-data-for-prediction-and-object-recognition-in/10.1117/12.485917.short?SSO=1.

* cited by examiner

METHODS AND SYSTEM FOR CONSTRUCTING DATA REPRESENTATION FOR USE IN ASSISTING AUTONOMOUS VEHICLES NAVIGATE INTERSECTIONS

BACKGROUND

The process of constructing a road network map for autonomous driving is typically a highly manual process. Human intervention is often needed to identify lane boundaries, associate lanes with traffic lights, determine yielding relationship between lanes and/or the like.

In order to produce consistent high-quality maps, these types of labeling tasks must be well-defined within policy guidelines. These constraints can make it difficult to create intersection data objects since intersection data objects are widely varied and do not lend themselves to policy guidelines. But intersection data objects include important properties such as, for example, information pertaining to inlets, outlets, conflicted space, metadata and/or the like.

This document describes methods and systems that are directed to addressing the problems described above, and/or other issues.

SUMMARY

In various embodiments, a system includes an electronic device of an autonomous vehicle, and a computer-readable storage medium having one or more programming instructions that, when executed, cause the electronic device to perform one or more actions. The system receives a road network map that corresponds to a road network that is in an environment of the autonomous vehicle. The road network map includes a plurality of lane segments of the road network. For each of the one or more lane segments, the system identifies one or more conflicting lane segments from the plurality of lane segments, each of which conflicts with the lane segment, and adds conflict data pertaining to a conflict between the lane segment and the one or more conflicting lane segments to a set of conflict data. The system analyzes the conflict data to identify a conflict cluster. The conflict cluster includes lane segments from the plurality of lane segments having related conflicts between or amongst them. The conflict cluster is representative of an intersection. For each lane segment in the conflict cluster, the system identifies a predecessor lane segment and identifies a successor lane segment. The system groups the identified predecessor lane segments and the successor lane segments as inlets or outlets of the intersection, generates an outer geometric boundary of the intersection, generates an inner geometric boundary of the intersection, creates a data representation of the intersection and adds the data representation to the road network map. The data representation of the intersection includes an indication of the lane segments within the intersection, an indication of the outer geometric boundary, and an indication of the inner geometric boundary.

The one or more of the lane segments may include one or more of the following: information identifying one or more lane segments that follow the lane segment in the road network map, information identifying one or more lane segments that precede the lane segment in the road network map, information identifying one or more lane segments that neighbor the lane segment in the road network map, or information identifying one or more lane segments that conflict with the lane segment.

The system may identify one or more conflicting lane segments from the plurality of lane segments that conflict with the lane segment by identifying one or more lane segments that intersect with or overlap the lane segment but do not originate from a same predecessor lane segment of the road network map as the lane segment.

The system may identify one or more conflicting lane segments from the plurality of lane segments that conflict with the lane segment by analyzing metadata of the lane segment to determine if it includes an indication that the lane segment has conflicts.

The system may identify one or more conflicting lane segments from the plurality of lane segments that conflict with the lane segment by performing a breadth-first search or a depth-first search of the road network map.

The outer geometric boundary may include a polygon that represents an outer boundary of the intersection.

The system may generate an outer geometric boundary by determining a convex hull of the lane segments in the conflict cluster.

The system may generate an inner geometric boundary of the intersection by identifying the lane segments in the conflict cluster, and for each lane segment in the conflict cluster, identify a centerline of the lane segment, determine a first intersection point that represents a first intersection of the centerline with a first lane boundary of one or more other lane segments of the intersection, determine a first auxiliary point and a second auxiliary point each associated with the first intersection point, determine a last intersection point representative of the last intersection of the centerline with a second lane boundary of one or more other lane segments of the intersection, determine a first auxiliary point and a second auxiliary point each associated with the last intersection point, and determine a complex hull of the following: the first intersection point, the first auxiliary point associated with the first intersection point, the second auxiliary point associated with the first intersection point, the last intersection point, the first auxiliary point associated with the last intersection point, and the second auxiliary point associated with the last intersection point.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

This document describes an automated method of constructing intersection data objects for autonomous vehicles to use while navigating intersections. An intersection data object, as described in more detail below, may be an element of a road network map representation and may encode various parameters such as those relating to inlets, outlets, traffic control measures, and yielding relationships, while preserving the concept of lane segments. An intersection data object may represent a specific intersection, and may be recognizable to the system as the same. For instance, the system may be able to distinguish one intersection data object from another intersection data object, and therefore one intersection from a different intersection.

This representation of an intersection may allow an autonomous vehicle prediction system to infer, for example, which outlet an actor is heading toward when the actor deviates substantially from the lanes as drawn in the road network map. Similarly, an autonomous vehicle motion planning system may utilize this representation of an intersection to, for example, understand the spatial relations between outlets determine how to handle situations where lanes are temporarily blocked by construction, parked cars, and/or the like.

In general, drivers do not precisely follow mapped lanes through intersections. This is especially true when the intersections do not have painted lane lines or other boundary indicators. For example, a driver may cut a turn through an intersection that may take the driver's vehicle onto a shoulder or into another lane as it navigates the intersection. As another example, a vehicle may change lanes while in an intersection, or may turn into the wrong outlet lane (e.g., not turning left into the leftmost lane, or not turning right into the rightmost lane). In these and similar situations, an autonomous vehicle prediction system may be unable to match these actors to known lane segments of the map, and may use the lane segments to guide generation of a forecasted trajectory. Instead, the prediction system may infer which outlet the actor is heading towards, and dynamically generate a lane segment that is not within the map.

Figure 1:
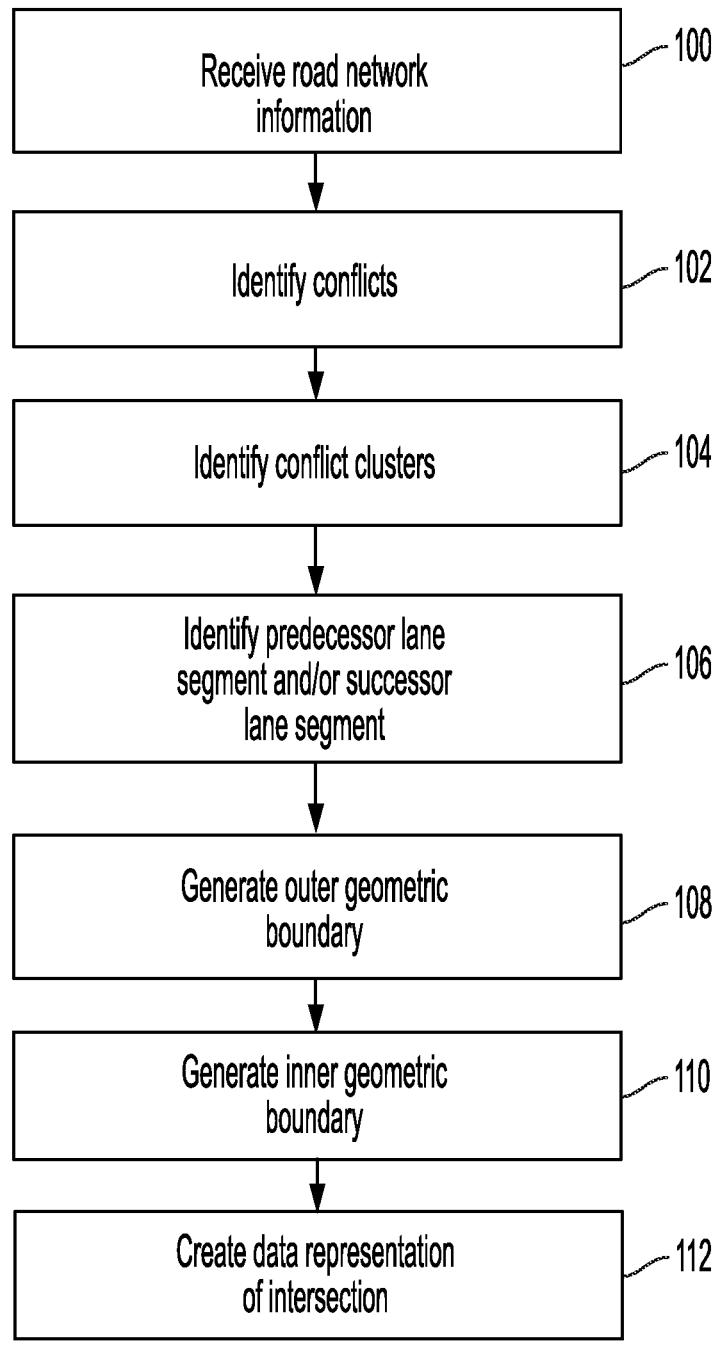
FIG. 1 illustrates a flow chart of an example method of generating an intersection data object.

FIG. 1 illustrates a flow chart of an example method of generating an intersection data object. As shown in FIG. 1, a system may receive 100 road network information (e.g., a map) corresponding to an environment of an autonomous vehicle. The system may receive road network information from a data store such as, for example, a map data store. At least a portion of road network information may be stored in memory onboard of an autonomous vehicle, may be accessed from a remote electronic device (e.g., a remote server), may be transmitted to an autonomous vehicle via a traffic node positioned in the area in which the vehicle is traveling, may be transmitted to an autonomous vehicle from one or more sensors, and/or the like.

In some embodiments, the road network information may include a road network map pertaining to the environment. A road may include one or more adjacent lanes, which may be divided by lane markings and are intended for a single line of traffic. Lanes may be split longitudinally at lane segments, sometimes at locations meaningful for motion planning (such as the start/end of an intersection) and/or at other locations that may not be meaningful for motion planning as an artifact of the map generation process. As used in this disclosure, a "lane segment" refers to a mapping construct that is associated with a segment of road.

Figure 2:
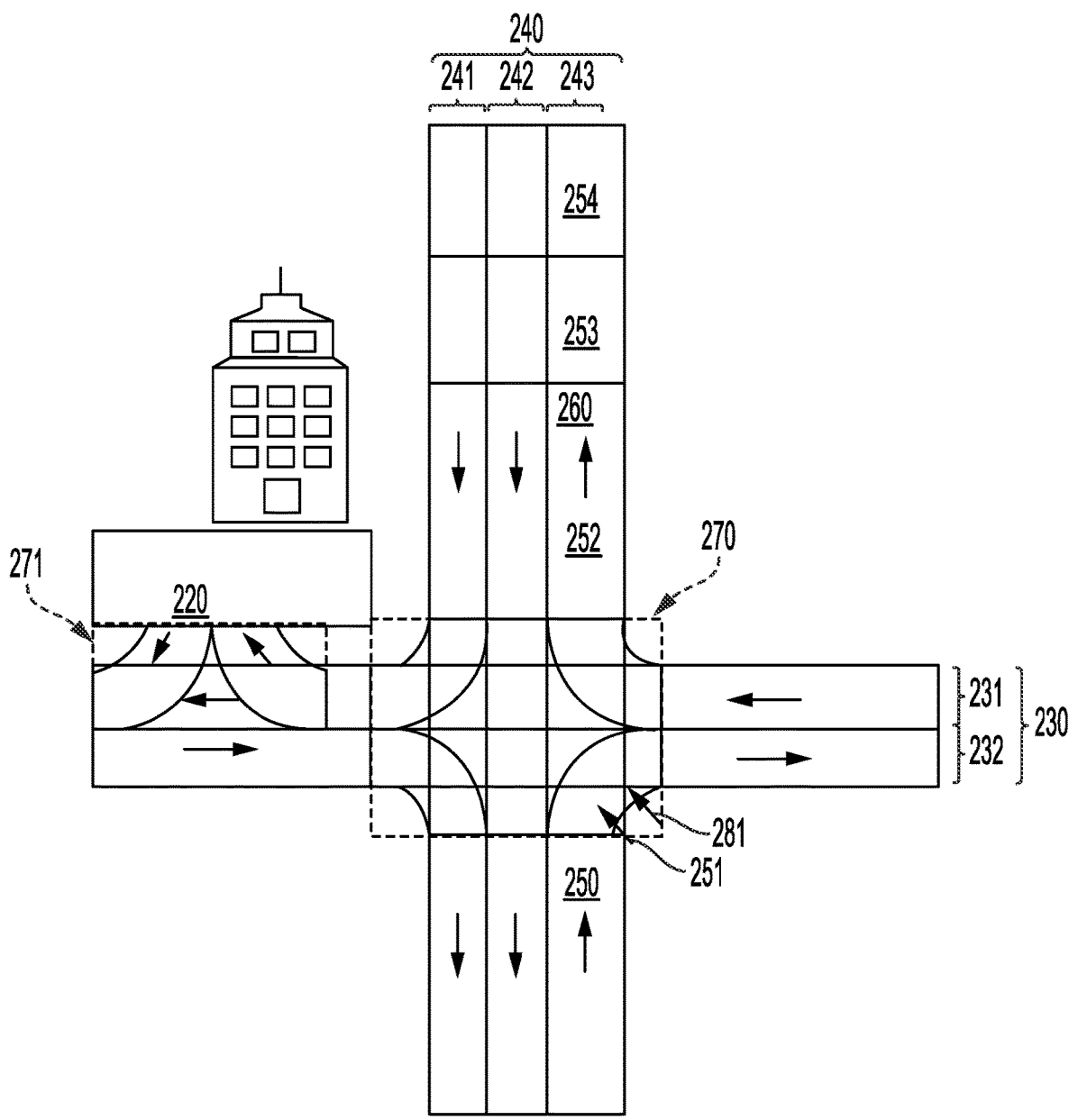
FIG. 2 illustrates an example road network.

The roads in the road network may include one or more lanes. For example, the road 230 in FIG. 2 includes lanes 231 and 232, and the road 240 includes lanes 241, 242, and 243. The lanes may be divided into a plurality of lane segments; for example, lane 243 includes consecutive lane segments 250, 251, 252, 253 and 254. Each lane segment has an associated direction of travel, which is indicated by the arrows in FIG. 2. For example, arrow 260 indicates the direction of travel in lane segment 252. The road network also includes intersections which include a lane segments that connect different roads or navigable areas. For example, intersection 270 connects roads 230 and 240, and intersection 271 connects the parking lot 220 to the road 230. Lane segment 250 has two successor lane segments in intersection 270-251 and 281. Lane segment 251 continues lane 243 in road 240, but the other successor lane segment 281 turns right and connects to lane 232 in the crossing road 230.

In some embodiments, receiving the road network information may include transcoding or reformatting the road network information, storing the reformatted road network information, or both. For example, the road network information may be used to create a graph representation of a road network as a vector map, a curvilinear map, a Cartesian map, or the like.

Referring back to FIG. 1, the system may identify 100 a road network map that corresponds to a road network or a portion of a road network for an autonomous vehicle. The road network map may include one or more representations of one or more geometric lane segments of the road network. These lane segments may include information pertaining to one or more relationships between one or more lane segments. For instance, a target lane segment may be associated with information identifying which lane segment(s) follow the target lane segment, which lane segment(s) precede the target lane segment, one or more lane segments that neighbor the target lane segment, one or more lane segments that conflict with the target lane segment, and/or the like.

Figure 3:
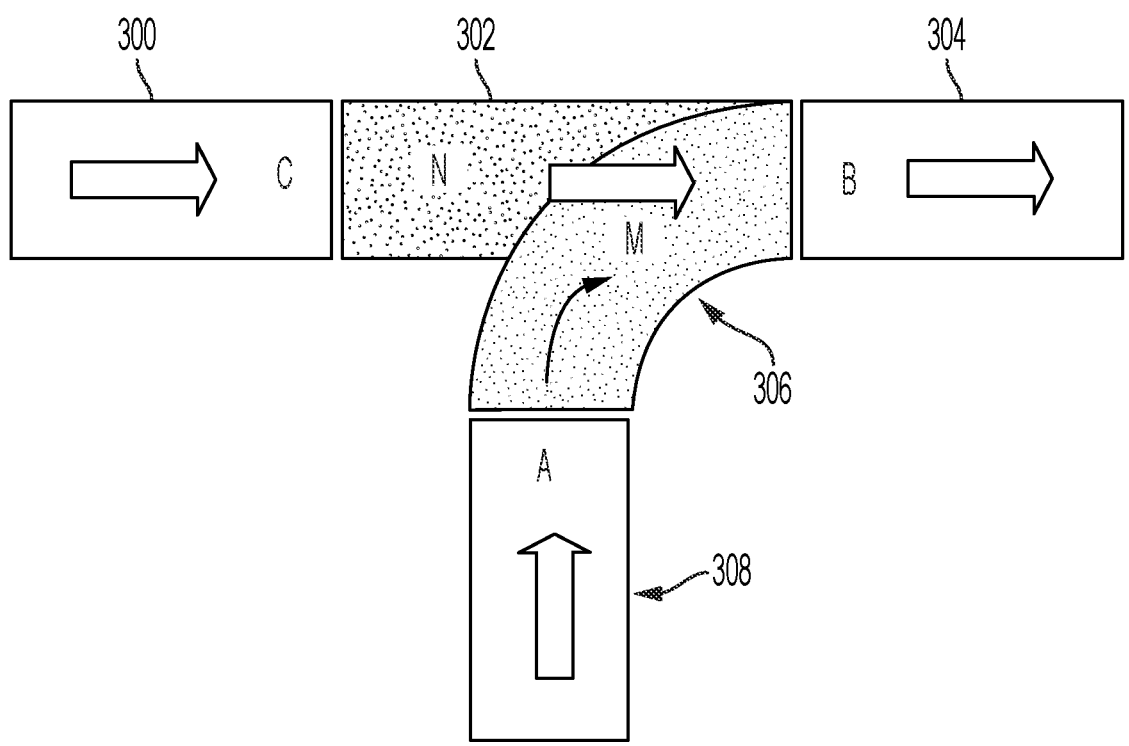
FIG. 3 illustrates an example representation of conflicting lane segments.

In various embodiments, a lane segment may conflict with one or more other lane segments. Two or more lane segments may conflict if they intersect or overlap and originate from the same predecessor segment of a road network. FIG. 3 illustrates an example representation of conflicting lane segments. As shown in FIG. 3, an intersection includes four lane segments A 308, B 304, C 300, N 302 and M 306. Lane segment N 302 and lane segment M 306 conflict because they intersect one another and do not originate from the same predecessor segment (lane segment N originates from lane segment C 300, and lane segment M originates from lane segment A 308). The flow of traffic is indicated by the arrows.

Referring back to FIG. 1, the system may identify 102 one or more conflicts between or amongst lane segments. For example, the system may parse the road network map to identify one or more target lane segments from a road network map, and may determine whether each identified target lane segment has any conflicts. For instance, for one or more identified target lane segments, the system may analyze the metadata of the target lane segment to determine if it includes an indication that the target lane segment has conflicts.

In response to determining that a target lane segment has conflicts, the system may search the road network map to identify all lane segments of the road network map that conflict with the target lane segment. The system may search the road network map using a breadth-first search, a depth-first search and/or other suitable searches.

This process may be repeated for other target lane segments. For instance, the system may iterate through all possible lane segments in order to identify 102 all conflicts that exist between or amongst the lane segments of the road network map. The system may add information pertaining to identified conflicts to a set of conflict data.

The system may analyze the set of conflict data to identify 104 one or more conflict clusters. A conflict cluster refers to a group of related conflicts between or amongst lane segments. A conflict cluster may include conflicts that are related or that coincide with one another. For example, referring back to FIG. 2, the system may identify that lane segment N 302 has a conflict with lane segment M 306, and that lane segment M has a conflict with lane segment N. These conflicts may be analyzed and identified 104 as a conflict cluster.

In various embodiments, the system may store information pertaining to one or more identified conflict clusters in one or more data stores. This information may include, for example, an identifier associated with a lane segment, an indication of one or more other lane segments that conflict with the lane segment, and/or the like.

A cluster of conflicts may be representative of an intersection. For each cluster of conflicts, the system may identify 106 a predecessor lane segment and/or a successor lane segment for each lane segment in the cluster. A predecessor lane segment may represent an inlet of the intersection. Similarly, a successor lane segment may represent an outlet of the intersection.

The system may identify 106 a predecessor lane segment and/or a successor lane segment by analyzing the metadata of a lane segment of the road network map to identify its predecessor(s) and/or its successor(s). For instance, referring to the example above and FIG. 2, a cluster may be identified as including lane segment M 306 and lane segment N 302, as these two lane segments conflict. This cluster may be representative of an intersection.

The system may analyze the metadata associated with lane segment M 306 to identify 106 lane segment A 308 as a predecessor lane segment to lane segment M, and to identify lane segment B 304 as a successor lane segment to lane segment M. Similarly, the system may analyze the metadata associated with lane segment N 302 to identify 106 lane segment C 300 as a predecessor lane segment to lane segment N, and to identify lane segment B 304 as a successor lane segment to lane segment N.

In various embodiments, the predecessor lane segments and successor lane segments that are identified may be grouped as inlets and outlets that are associated with the intersection. An inlet refers to a mapped lane segment entering an intersection. An outlet refers to a mapped lane segment exiting an intersection. In various embodiments, a predecessor lane segment to a target lane segment along the same flow of traffic may be an inlet, while a successor lane segment to a target lane segment along the same flow of traffic may be an outlet. For example, referring to FIG. 3, lane segment C 300 is a predecessor lane segment to lane segment N 302 along the same flow of traffic, so lane segment C may be considered an inlet. Similarly, lane segment B 304 is a successor lane segment to lane segment N 302 along the same flow of traffic, so lane segment B may be considered an outlet.

The system may generate 108 an outer geometric boundary of an intersection. The system may generate 108 an outer geometric boundary of an intersection by determining the convex hull of points of the intersection. The convex hull of a set of points S in n dimensions is where all convex sets that contain S intersect. In other words, a convex hull of a shape is the smallest convex set that contains it. With respect to an outer geometric boundary of an intersection, the outer geometric boundary may be the smallest convex set that contains all of the segments of the intersection. For example, to generate an outer geometric boundary of an intersection, a convex hull of the set of points making up the polygons of all segments of the intersection may be determined. In various embodiments, the outer geometric boundary of an intersection may be the smallest convex set that contains all of the lane segments in a conflict cluster of the intersection. The outer geometric boundary of an intersection may include intersection segments, and not inlets or outlets of the intersection.

Figure 4:
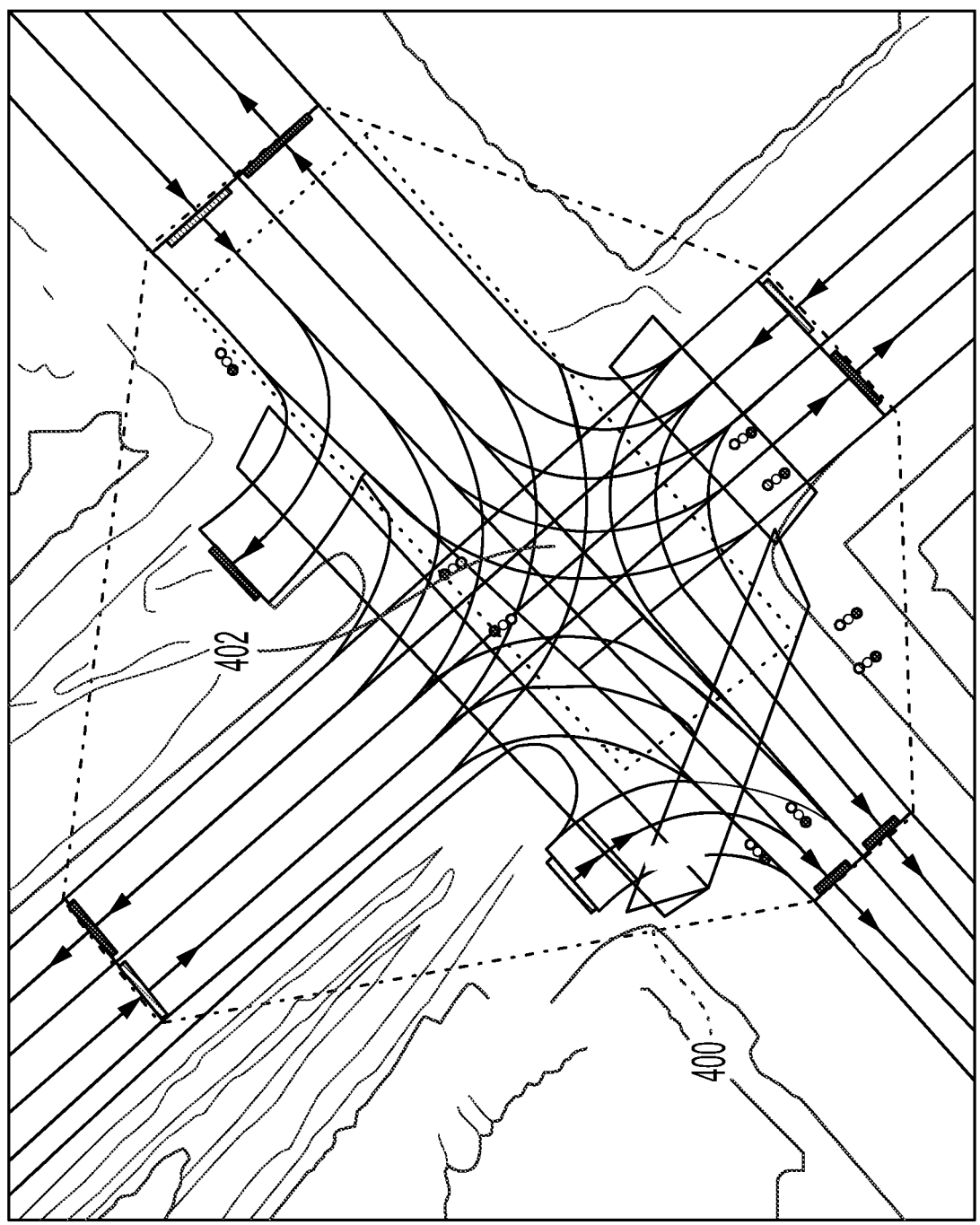
FIG. 4 illustrates a visual representation of an example outer geometric boundary of an example intersection.

FIG. 4 illustrates a visual representation of an example outer geometric boundary 400 of an example intersection 402 according to an embodiment. As shown in FIG. 4, the outer geometric boundary 400 extends around the intersection 402 and surrounds all segments of the intersection.

In various embodiments, the outer geometric boundary may be used by the system, for example, as a reference point to ascertain whether an autonomous vehicle, object or actor is near or within an intersection.

Referring back to FIG. 1, the system may generate 110 an inner geometric boundary of intersection. The inner geometric boundary may represent the area of an intersection. An inner geometric boundary may surround a contested space within an intersection. For example, an inner geometric boundary may surround a shared space of an intersection that one or more actors traverse in order to access one or more inlets and/or outlets of the intersection.

The system may generate 110 an inner geometric boundary of an intersection by determining the convex hull of points that are derived from conflict lines within the intersection, as discussed in more detail below.

Figure 5:
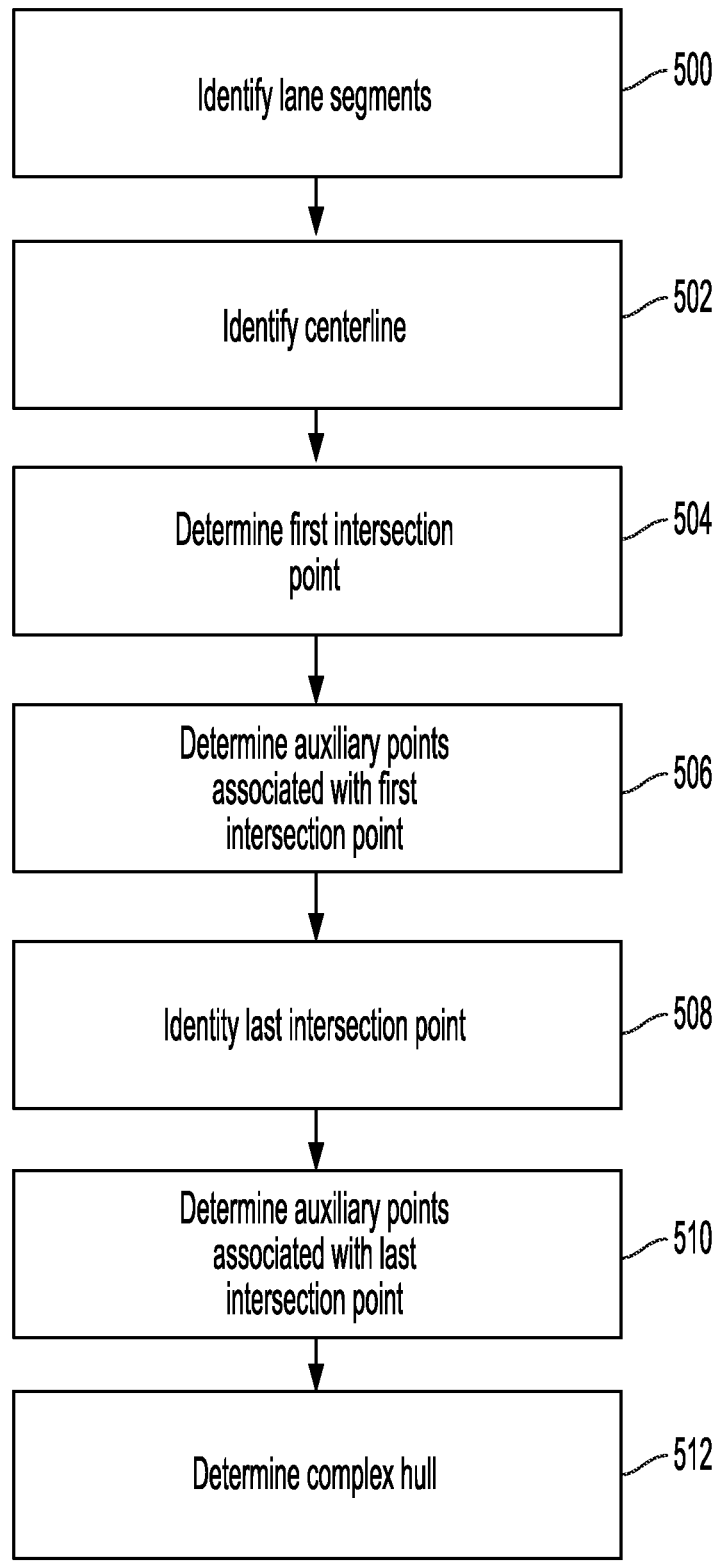
FIG. 5 is a flow chart of an example method of generating in inner geometric boundary of an intersection.

FIG. 5 is a flow chart of an example method of generating 110 in inner geometric boundary of an intersection. The system may identify 500 all of the lane segments within the intersection. For example, the system may identify 500 all of the lane segments within the conflict cluster associated with the intersection. For each identified lane segment, the system may identify 502 a centerline of the lane segment. The system may determine 504 a first intersection point representative of the first intersection of the centerline with another lane boundary of a different lane segment of the intersection. The system may determine 506 at least two additional auxiliary points associated with the first intersection point. One such auxiliary point may be approximately half a lane width in a first normal direction, and another auxiliary point may be approximately half a lane width in a second normal direction.

The system may determine 508 a last intersection point representative of the last intersection of the centerline with another lane boundary of a different lane segment of the intersection. The system may determine 510 at least two additional auxiliary points associated with the last intersection point. One such auxiliary point may be approximately half a lane width in a first normal direction, and another auxiliary point may be approximately half a lane width in a second normal direction.

In various embodiments, the system may determine 512 the convex hull of the first intersection point, the second intersection point, and all of the auxiliary points to generate the inner geometric boundary.

Figure 6:
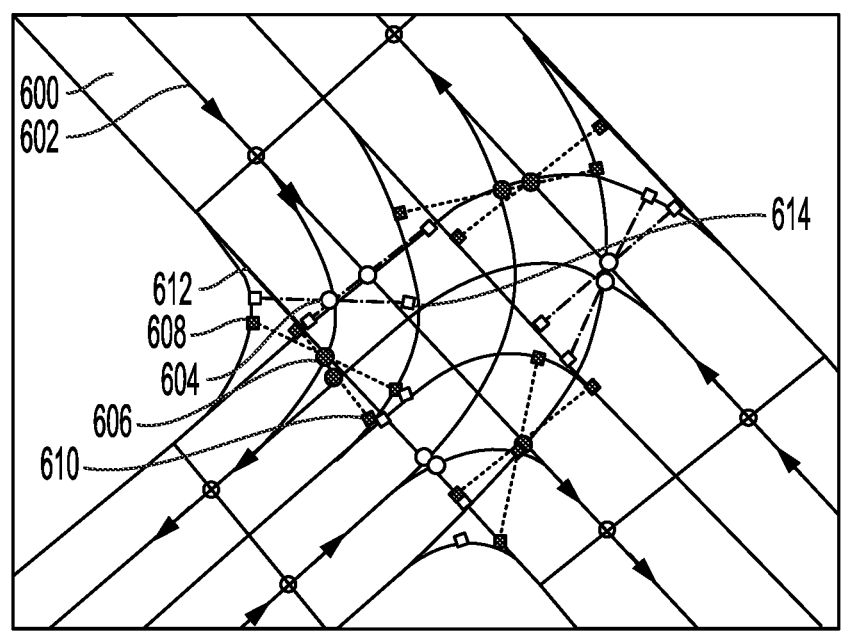
FIG. 6 illustrates example lane segments, centerlines and auxiliary points.

FIG. 6 illustrates example lane segments, centerlines and auxiliary points. For example, reference 602 is the centerline of lane 600. The first intersection of the centerline 602 with a boundary line of another lane segment in the intersection is represented by 604, while the last intersection of the centerline 602 with a boundary line of another lane segment in the intersection is represented by 606. References 612 and 614 represent the auxiliary points associated with 604, and references 608 and 610 represent the auxiliary points associated with 606.

Figure 7:
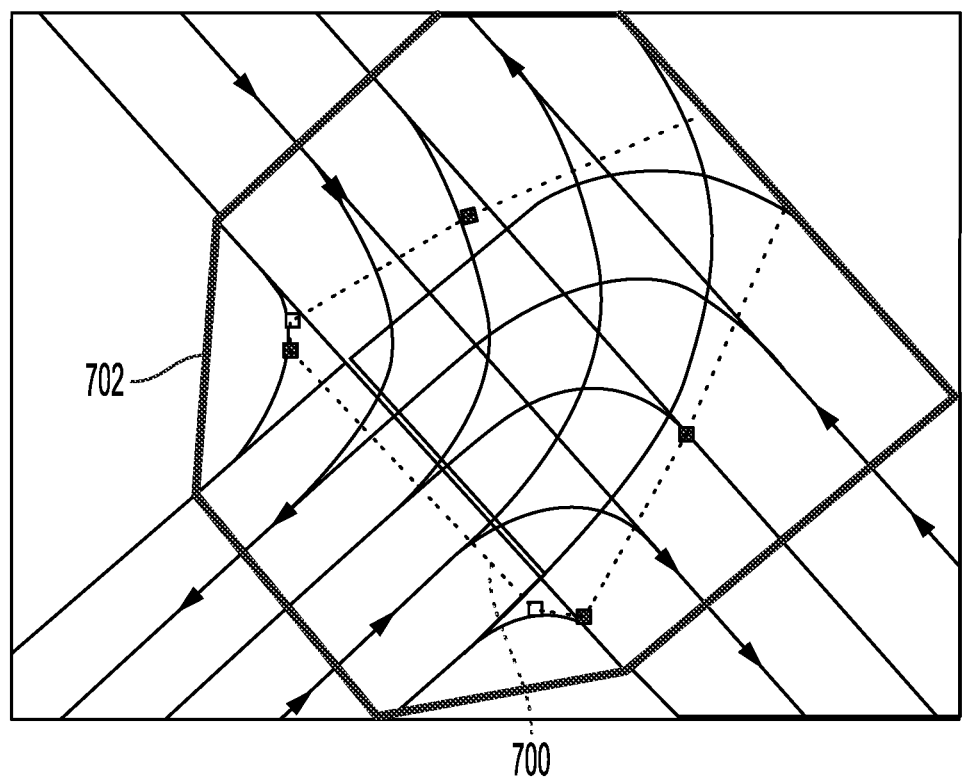
FIG. 7 illustrates an example inner geometric boundary.
Figure 8:
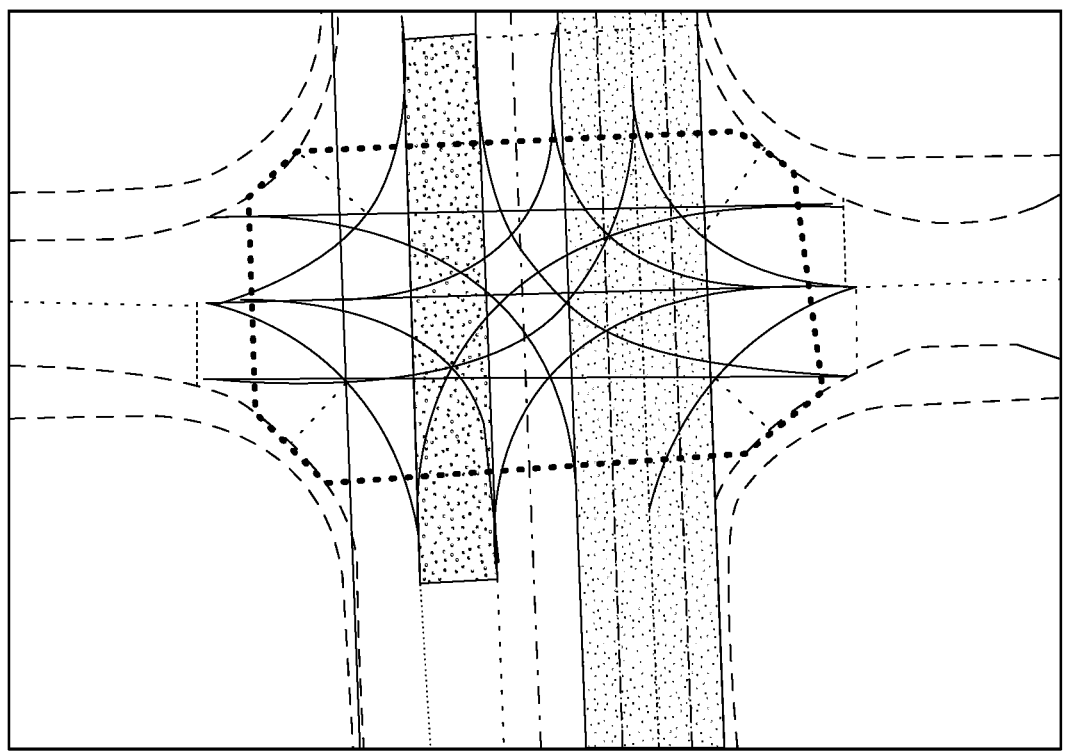
FIG. 8 illustrates an example inner geometric boundary.

FIG. 7 illustrates an example inner geometric boundary 700 and outer geometric boundary 702 associated with the intersection depicted in FIG. 6. FIG. 8 illustrates an example inner geometric boundary for a different intersection according to an embodiment.

The inner geometric boundary may represent a minimal polygon in which trajectories from a given inlet to a given outlet of an intersection is expected. Referring to FIG. 7, the inner geometric boundary of the intersection is represented as 700.

In various embodiments, the system may create 112 an intersection data object for an intersection. An intersection data object refers to a data representation of an intersection. For example, an intersection data object may be a data structure or other data construct. The system may assign a unique intersection identifier to the intersection data object. The unique intersection identifier may be random or pseudo-randomly generated. Alternatively, the unique intersection identifier may be sequentially or otherwise assigned by the system.

The system may add a listing of the lane segments that form the intersection in the intersection data object. The listing may identify the lane segments by their unique segment identifier. For instance, the system may parse the road network map to identify a unique segment identifier associated with a lane segment of the intersection, and may add this unique segment identifier to the intersection data object.

In various embodiments, the system may update the metadata of one or more lane segments of the road network map to include the unique intersection identifier of the intersection of which the lane segment is a part.

The system may add information pertaining to the outer geographic boundary of the intersection and/or the inner geographic boundary of the intersection. For example, one or more polygons representing an inner convex hull and/or an outer convex hull may be stored as data members of an associated intersection data object.

In various embodiments, the system may store an intersection data object in one or more data stores such that it is accessible by one or more systems or subsystems of the autonomous vehicle such as, for example, a prediction system, a perception system, a motion planning system, and/or the like. The system may add the intersection data object to one or more maps such as, for example, a road network map. As such, when the map is loaded, information pertaining to the intersection data object may be presented to a system user. For instance, the inner geometric boundary and/or the outer geometric boundary may be visually displayed via one or more display devices. Other presentations of information pertaining to an intersection data object are contemplated within the scope of this disclosure.

The intersection data object may be used by an autonomous vehicle in a variety of ways. For example, a prediction system of an autonomous vehicle may use information within an intersection data object to navigate the intersection rather than following lanes as mapped. As another example, a prediction system of an autonomous vehicle may use information from an intersection data object to predict the behavior of one or more actors in proximity to the intersection. For instance, a prediction system may predict that a particular actor will stop in proximity to the inner geographic boundary of an intersection and may make one or more decisions concerning the operation of the autonomous vehicle based on this behavior.

As another example, a prediction system may predict where one or more other vehicles may stop and/or yield (even if such vehicle passes a stop sign or designated waiting position) prior to the autonomous vehicle traversing an intersection.

As yet another example, an autonomous vehicle may utilize an intersection data object to predict and/or monitor trajectories of other vehicles that do not reflect mapped paths through the intersection.

As another example, an autonomous vehicle may track various statistics on an intersection-by-intersection basis to help the autonomous vehicle better understand its environment.

Figure 9:
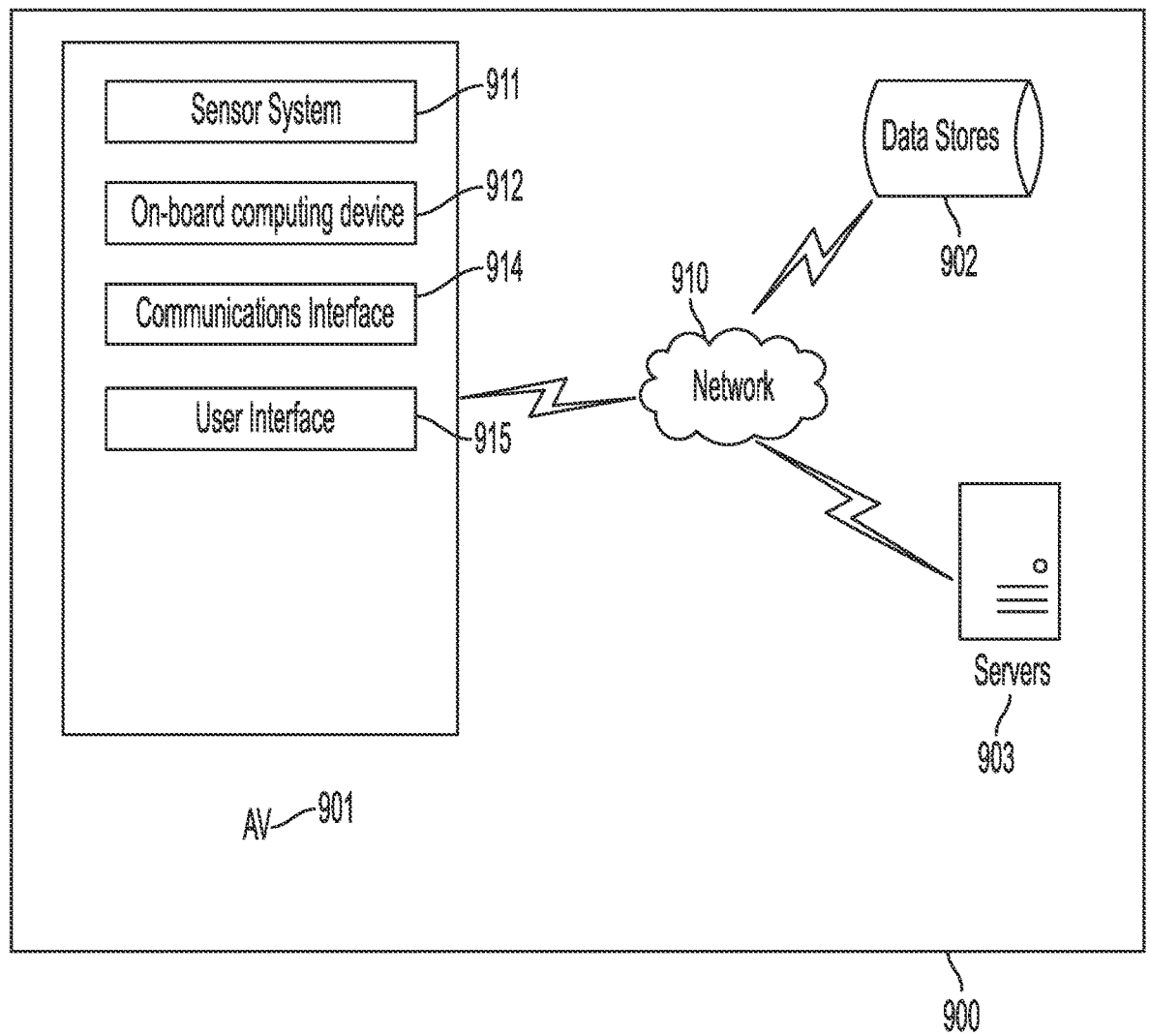
FIG. 9 is a block diagram illustrating an example autonomous vehicle system.

FIG. 9 is a block diagram illustrating an example system 900 that includes an autonomous vehicle 901 in communication with one or more data stores 902 and/or one or more servers 903 via a network 910. Although there is one autonomous vehicle shown, multiple autonomous vehicles may be coupled to each other and/or coupled to data stores 902 and/or servers 903 over network 910. Network 910 may be any type of network such as a local area network (LAN), a wide area network (WAN) such as the Internet, a cellular network, a satellite network, or a combination thereof, and may be wired or wireless. Data store(s) 902 may be any kind of data store such as, without limitation, map data store(s), traffic information data store(s), user information data store(s), point of interest data store(s), or any other type of content data store(s). Server(s) 903 may be any kind of servers or a cluster of servers, such as, without limitation, Web or cloud servers, application servers, backend servers, or a combination thereof.

As illustrated in FIG. 9, the autonomous vehicle 901 may include a sensor system 911, an on-board computing device 912, a communications interface 914, and a user interface 915. Autonomous vehicle 901 may further include certain components (as illustrated, for example, in FIG. 10) included in vehicles, such as, an engine, wheel, steering wheel, transmission, etc., which may be controlled by the on-board computing device 912 using a variety of communication signals and/or commands, such as, for example, acceleration signals or commands, deceleration signals or commands, steering signals or commands, braking signals or commands, etc.

The sensor system 911 may include one or more sensors that are coupled to and/or are included within the autonomous vehicle 901. Examples of such sensors include, without limitation, a LiDAR system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the autonomous vehicle 901, information about the environment itself, information about the motion of the autonomous vehicle 901, information about a route of the autonomous vehicle, or the like. As autonomous vehicle 901 travels over a surface, at least some of the sensors may collect data pertaining to the surface.

The LiDAR system may include a sensor configured to sense or detect objects and/or actors in an environment in which the autonomous vehicle 901 is located. Generally, LiDAR system is a device that incorporates optical remote sensing technology that can measure distance to a target and/or other properties of a target (e.g., a ground surface) by illuminating the target with light. As an example, the LiDAR system may include a laser source and/or laser scanner configured to emit laser pulses and a detector configured to receive reflections of the laser pulses. For example, the LiDAR system may include a laser range finder reflected by a rotating mirror, and the laser is scanned around a scene being digitized, in one, two, or more dimensions, gathering distance measurements at specified angle intervals. The LiDAR system, for example, may be configured to emit laser pulses as a beam. Optionally, the beam may be scanned to generate two dimensional or three dimensional range matrices. In an example, the range matrices may be used to determine distance to a given vehicle or surface by measuring time delay between transmission of a pulse and detection of a respective reflected signal. In some examples, more than one LiDAR system may be coupled to the first vehicle to scan a complete 360° horizon of the first vehicle. The LiDAR system may be configured to provide to the computing device a cloud of point data representing the surface(s), which have been hit by the laser. The points may be represented by the LiDAR system in terms of azimuth and elevation angles, in addition to range, which can be converted to (X, Y, Z) point data relative to a local coordinate frame attached to the vehicle. Additionally, the LiDAR may be configured to provide intensity values of the light or laser reflected off the surfaces that may be indicative of a surface type. In examples, the LiDAR system may include components such as light (e.g., laser) source, scanner and optics, photo-detector and receiver electronics, and position and navigation system. In an example, The LiDAR system may be configured to use ultraviolet (UV), visible, or infrared light to image objects and can be used with a wide range of targets, including non-metallic objects. In one example, a narrow laser beam can be used to map physical features of an object with high resolution.

It should be noted that the LiDAR systems for collecting data pertaining to the surface may be included in systems other than the autonomous vehicle 901 such as, without limitation, other vehicles (autonomous or driven), robots, satellites, etc.

Figure 10:
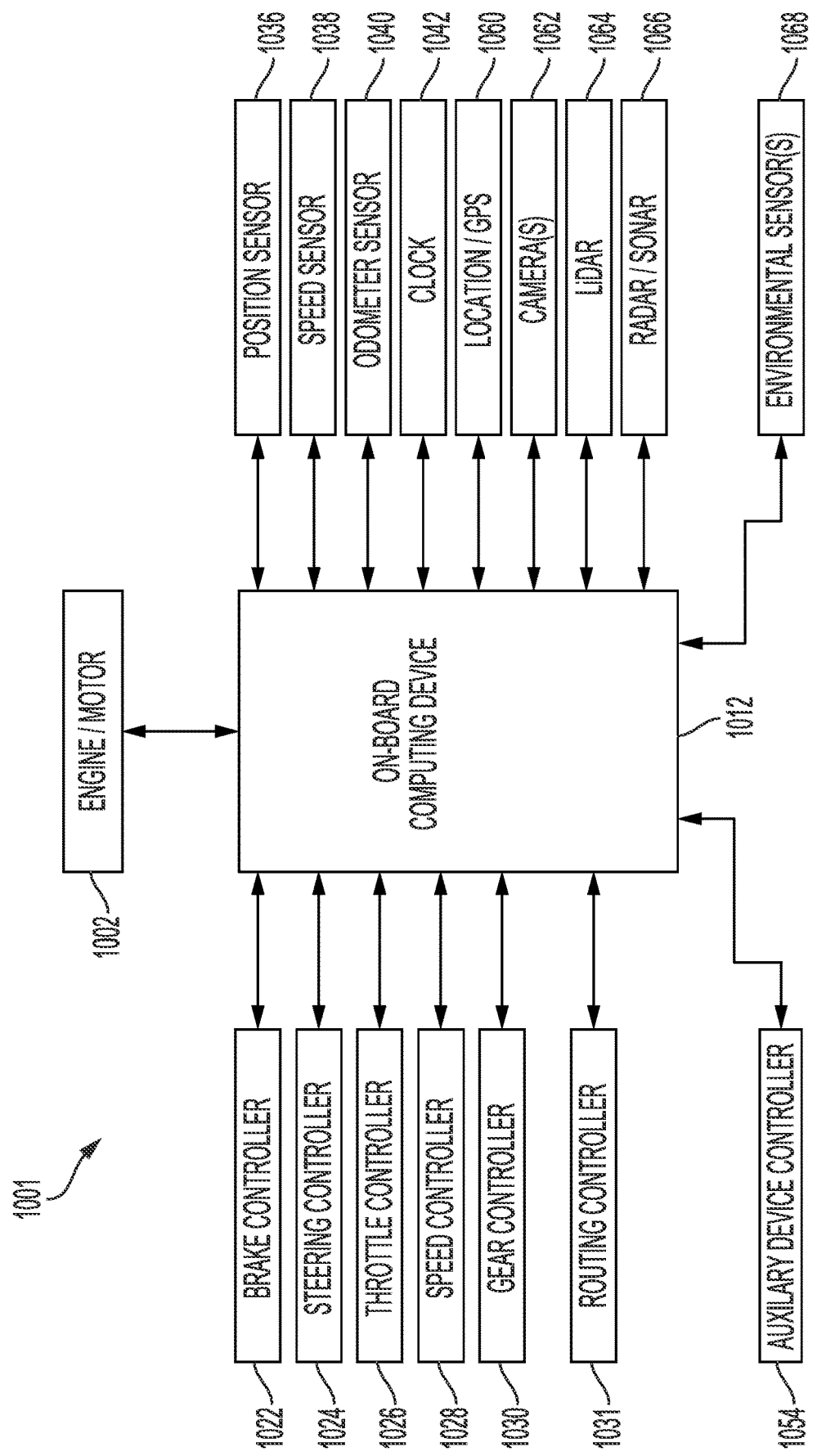
FIG. 10 illustrates an example vehicle controller system.

FIG. 10 illustrates an example system architecture for a vehicle 1001, such as the autonomous vehicle 901 of FIG. 1 autonomous vehicle. The vehicle 1001 may include an engine or motor 1002 and various sensors for measuring various parameters of the vehicle and/or its environment. Operational parameter sensors that are common to both types of vehicles include, for example: a position sensor 1036 such as an accelerometer, gyroscope and/or inertial measurement unit; a speed sensor 1038; and an odometer sensor 1040. The vehicle 1001 also may have a clock 1042 that the system architecture uses to determine vehicle time during operation. The clock 1042 may be encoded into the vehicle on-board computing device 1012. It may be a separate device, or multiple clocks may be available.

The vehicle 1001 also may include various sensors that operate to gather information about the environment in which the vehicle is traveling. These sensors may include, for example: a location sensor 1060 such as a GPS device; object detection sensors such as one or more cameras 1062; a LiDAR sensor system 1064; and/or a radar and or and/or a sonar system 1066. The sensors also may include environmental sensors 1068 such as a precipitation sensor and/or ambient temperature sensor. The object detection sensors may enable the vehicle 1001 to detect objects that are within a given distance or range of the vehicle 1001 in any direction, while the environmental sensors collect data about environmental conditions within the vehicle's area of travel. The system architecture will also include one or more cameras 1062 for capturing images of the environment.

During operations, information is communicated from the sensors to an on-board computing device 1012. The on-board computing device 1012 analyzes the data captured by the sensors and optionally controls operations of the vehicle based on results of the analysis. For example, the on-board computing device 1012 may control braking via a brake controller 1022; direction via a steering controller 1024; speed and acceleration via a throttle controller 1026 (in a gas-powered vehicle) or a motor speed controller 1028 (such as a current level controller in an electric vehicle); a differential gear controller 1030 (in vehicles with transmissions); and/or other controllers such as an auxiliary device controller 1054.

Geographic location information may be communicated from the location sensor 260 to the on-board computing device 1012, which may then access a map of the environment that corresponds to the location information to determine known fixed features of the environment such as streets, buildings, stop signs and/or stop/go signals. Captured images from the cameras 1062 and/or object detection information captured from sensors such as a LiDAR system 1064 is communicated from those sensors to the on-board computing device 1012. The object detection information and/or captured images may be processed by the on-board computing device 1012 to detect objects in proximity to the vehicle 1001. In addition or alternatively, the vehicle 1001 may transmit any of the data to a remote server system 903 (FIG. 1) for processing. Any known or to be known technique for making an object detection based on sensor data and/or captured images can be used in the embodiments disclosed in this document.

The on-board computing device 1012 may obtain, retrieve, and/or create map data that provides detailed information about the surrounding environment of the autonomous vehicle 1001. The on-board computing device 1012 may also determine the location, orientation, pose, etc. of the AV in the environment (localization) based on, for example, three dimensional position data (e.g., data from a GPS), three dimensional orientation data, predicted locations, or the like. For example, the on-board computing device 1012 may receive GPS data to determine the AV's latitude, longitude and/or altitude position. Other location sensors or systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location. The map data can provide information regarding: the identity and location of different roadways, road segments, lane segments, buildings, or other items; the location, boundaries, and directions of traffic lanes (e.g., the location and direction of a parking lane, a turning lane, a bicycle lane, or other lanes within a particular roadway) and metadata associated with traffic lanes; traffic control data (e.g., the location and instructions of signage, traffic lights, or other traffic control devices); and/or any other map data that provides information that assists the on-board computing device 1012 in analyzing the surrounding environment of the autonomous vehicle 1001.

In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on historical observations of vehicles or other objects over a period of time (e.g., reference paths for straight line travel, lane merge, a turn, or the like).

In certain embodiments, the on-board computing device 1012 may also include and/or may receive information relating to the trip or route of a user, real-time traffic information on the route, or the like.

The on-board computing device 1012 may include and/or may be in communication with a routing controller 1031 that generates a navigation route from a start position to a destination position for an autonomous vehicle. The routing controller 1031 may access a map data store to identify possible routes and road segments that a vehicle can travel on to get from the start position to the destination position. The routing controller 1031 may score the possible routes and identify a preferred route to reach the destination. For example, the routing controller 1031 may generate a navigation route that minimizes Euclidean distance traveled or other cost function during the route, and may further access the traffic information and/or estimates that can affect an amount of time it will take to travel on a particular route. Depending on implementation, the routing controller 1031 may generate one or more routes using various routing methods, such as Dijkstra's algorithm, Bellman-Ford algorithm, or other algorithms. The routing controller 1031 may also use the traffic information to generate a navigation route that reflects expected conditions of the route (e.g., current day of the week or current time of day, etc.), such that a route generated for travel during rush-hour may differ from a route generated for travel late at night. The routing controller 1031 may also generate more than one navigation route to a destination and send more than one of these navigation routes to a user for selection by the user from among various possible routes.

In various embodiments, an on-board computing device 1012 may determine perception information of the surrounding environment of the autonomous vehicle 1001. Based on the sensor data provided by one or more sensors and location information that is obtained, the on-board computing device 1012 may determine perception information of the surrounding environment of the autonomous vehicle 1001. The perception information may represent what an ordinary driver would perceive in the surrounding environment of a vehicle. The perception data may include information relating to one or more objects in the environment of the autonomous vehicle 1001. For example, the on-board computing device 1012 may process sensor data (e.g., LiDAR or RADAR data, camera images, etc.) in order to identify objects and/or features in the environment of autonomous vehicle 1001. The objects may include traffic signals, road way boundaries, other vehicles, pedestrians, and/or obstacles, etc. The on-board computing device 1012 may use any now or hereafter known object recognition algorithms, video tracking algorithms, and computer vision algorithms (e.g., track objects frame-to-frame iteratively over a number of time periods) to determine the perception.

In some embodiments, the on-board computing device 1012 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 1012 may perform one or more prediction and/or forecasting operations. For example, the on-board computing device 1012 may predict future locations, trajectories, and/or actions of one or more objects. For example, the on-board computing device 1012 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the autonomous vehicle 1001, the surrounding environment, and/or their relationship(s). For example, if an object is a vehicle and the current driving environment includes an intersection, the on-board computing device 1012 may predict whether the object will likely move straight forward or make a turn. If the perception data indicates that the intersection has no traffic light, the on-board computing device 1012 may also predict whether the vehicle may have to fully stop prior to enter the intersection.

In various embodiments, the on-board computing device 1012 may determine a motion plan for the autonomous vehicle. For example, the on-board computing device 1012 may determine a motion plan for the autonomous vehicle based on the perception data and/or the prediction data. Specifically, given predictions about the future locations of proximate objects and other perception data, the on-board computing device 1012 can determine a motion plan for the autonomous vehicle 1001 that best navigates the autonomous vehicle relative to the objects at their future locations.

In one or more embodiments, the on-board computing device 1012 may receive predictions and make a decision regarding how to handle objects and/or actors in the environment of the autonomous vehicle 1001. For example, for a particular actor (e.g., a vehicle with a given speed, direction, turning angle, etc.), the on-board computing device 1012 decides whether to overtake, yield, stop, and/or pass based on, for example, traffic conditions, map data, state of the autonomous vehicle, etc. Furthermore, the on-board computing device 1012 also plans a path for the autonomous vehicle 1001 to travel on a given route, as well as driving parameters (e.g., distance, speed, and/or turning angle). That is, for a given object, the on-board computing device 1012 decides what to do with the object and determines how to do it. For example, for a given object, the on-board computing device 1012 may decide to pass the object and may determine whether to pass on the left side or right side of the object (including motion parameters such as speed). The on-board computing device 1012 may also assess the risk of a collision between a detected object and the autonomous vehicle 1001. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 1012 may execute one or more control instructions to perform a cautious maneuver (e.g., mildly slow down, accelerate, change lane, or swerve). In contrast, if the collision cannot be avoided, then the on-board computing device 912 may execute one or more control instructions for execution of an emergency maneuver (e.g., brake and/or change direction of travel).

As discussed above, planning and control data regarding the movement of the autonomous vehicle is generated for execution. The on-board computing device 1012 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

In the various embodiments discussed in this document, the description may state that the vehicle or a controller included in the vehicle (e.g., in an on-board computing system) may implement programming instructions that cause the vehicle and/or a controller to make decisions and use the decisions to control operations of the vehicle. However, the embodiments are not limited to this arrangement, as in various embodiments the analysis, decision making and/or operational control may be handled in full or in part by other computing devices that are in electronic communication with the vehicle's on-board computing device and/or vehicle control system. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

Referring back to FIG. 9, the communications interface 914 may be configured to allow communication between autonomous vehicle 901 and external systems, such as, for example, external devices, sensors, other vehicles, servers, data stores, databases etc. Communications interface 914 may utilize any now or hereafter known protocols, protection schemes, encodings, formats, packaging, etc. such as, without limitation, Wi-Fi, an infrared link, Bluetooth, vehicle-to-vehicle, vehicle-to-object, or V2X communication protocols, etc. (The term "V2X" refers to a communication between a vehicle and any object that the vehicle that may encounter or affect in its environment.) User interface system 915 may be part of peripheral devices implemented within a vehicle 901 including, for example, a keyword, a touch screen display device, a microphone, and a speaker, etc.

Figure 11:
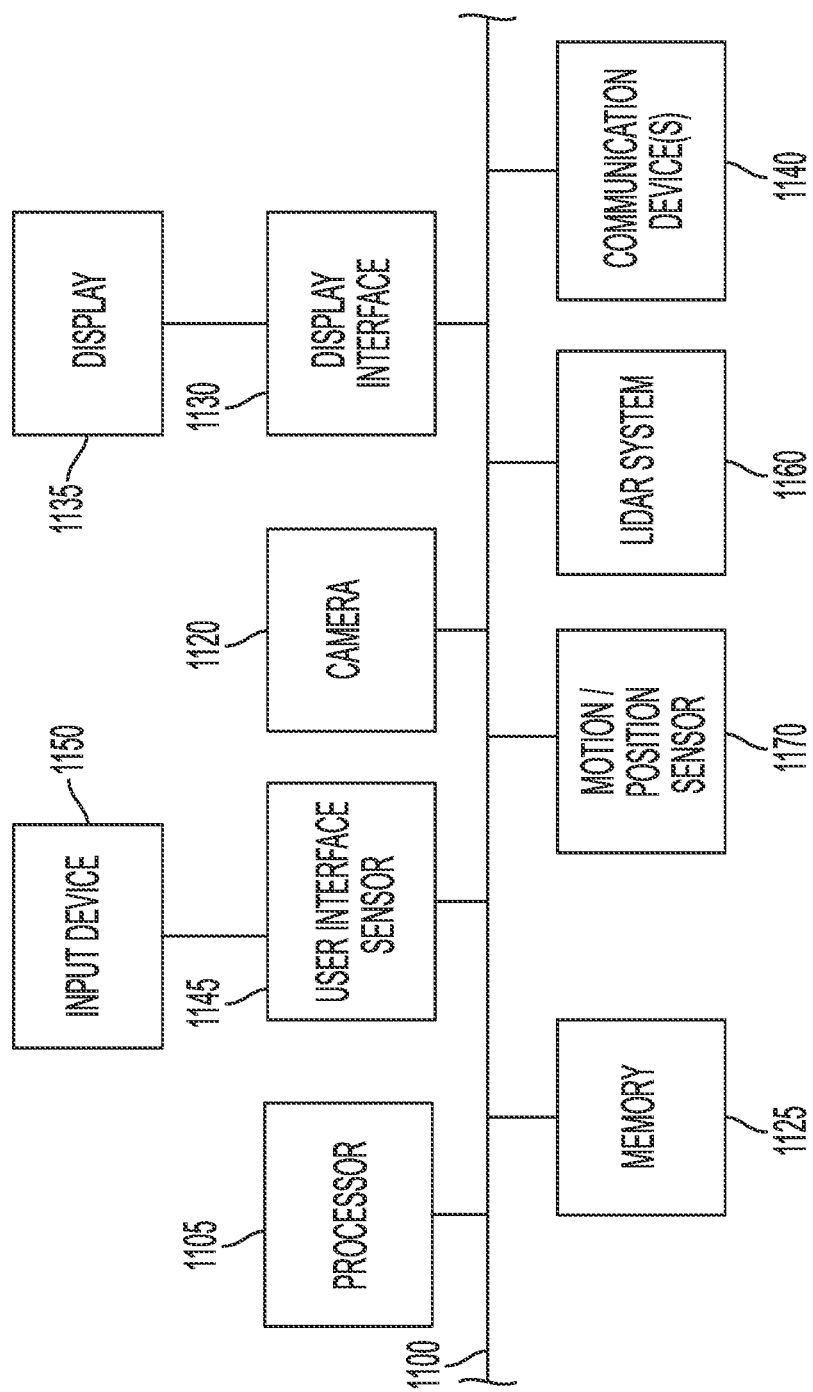
FIG. 11 is a block diagram that illustrates various elements of a possible electronic system, subsystem, controller and/or other component of an AV, and/or external electronic device.

FIG. 11 depicts an example of internal hardware that may be included in any of the electronic components of the system, such as internal processing systems of the AV, external monitoring and reporting systems, or remote servers. An electrical bus 1100 serves as an information highway interconnecting the other illustrated components of the hardware. Processor 1105 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 1125. A memory device may include a single device or a collection of devices across which data and/or instructions are stored. Various embodiments may include a computer-readable medium containing programming instructions that are configured to cause one or more processors to perform the functions described in the context of the previous figures.

An optional display interface 1130 may permit information from the bus 1100 to be displayed on a display device 1135 in visual, graphic or alphanumeric format, such on an in-dashboard display system of the vehicle. An audio interface and audio output (such as a speaker) also may be provided. Communication with external devices may occur using various communication devices 1140 such as a wireless antenna, a radio frequency identification (RFID) tag and/or short-range or near-field communication transceiver, each of which may optionally communicatively connect with other components of the device via one or more communication system. The communication device(s) 1140 may be configured to be communicatively connected to a communications network, such as the Internet, a local area network or a cellular telephone data network.

The hardware may also include a user interface sensor 1145 that allows for receipt of data from input devices 1150 such as a keyboard or keypad, a joystick, a touchscreen, a touch pad, a remote control, a pointing device and/or microphone. Digital image frames also may be received from a camera 1120 that can capture video and/or still images. The system also may receive data from a motion and/or position sensor 1170 such as an accelerometer, gyroscope or inertial measurement unit. The system also may receive data from a LiDAR system 1160 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

In this document, the terms "street," "lane" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" may represent an airway and a lane may be a portion of the airway. If the autonomous vehicle is a watercraft, then the term "street" may represent a waterway and a lane may be a portion of the waterway.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable storage medium," "data store," "data storage facility" and the like each refer to a non-transitory device on which computer-readable data, programming instructions or both are stored. Except where specifically stated otherwise, the terms "memory," "memory device," "computer-readable storage medium," "data store," "data storage facility" and the like are intended to include single device embodiments, embodiments in which multiple memory devices together or collectively store a set of data or instructions, as well as individual sectors within such devices.

The term "object", when referring to an object that is detected by a vehicle perception system or simulated by a simulation system, is intended to encompass both stationary objects and moving (or potentially moving) actors, except where specifically stated otherwise by terms use of the term "actor" or "stationary object."

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

The term "road network map" refers to a graphical representation of one or more roads. This representation may include information pertaining to lanes, lane segments, lane boundaries, traffic lights, yielding relationships, and/or other traffic or road-related information.

In this document, when relative terms of order such as "first" and "second" are used to modify a noun, such use is simply intended to distinguish one item from another, and is not intended to require a sequential order unless specifically stated.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The invention claimed is:

1. A method, comprising:
by an electronic device of an autonomous vehicle:
receiving a road network map that corresponds to a road network that is in an environment of the autonomous vehicle, wherein the road network map comprises a plurality of lane segments of the road network;
for each of the plurality of lane segments:
identifying one or more conflicting lane segments from the plurality of lane segments, each of which conflicts with the lane segment, and
adding conflict data pertaining to a conflict between the lane segment and the one or more conflicting lane segments to a set of conflict data;
analyzing the conflict data to identify a conflict cluster, wherein the conflict cluster comprises lane segments from the plurality of lane segments having related conflicts between or amongst them, wherein the conflict cluster is representative of an intersection;
for each lane segment in the conflict cluster:
identifying a predecessor lane segment, and
identifying a successor lane segment;
grouping the identified predecessor lane segments and the successor lane segments as inlets or outlets of the intersection;
generating an outer geometric boundary of the intersection based on a first convex hull of the lane segments in the conflict cluster, wherein the outer geometric boundary surrounds certain lane segment of the conflict cluster that define the intersection and that were not grouped as the inlets and outlets of the intersection, and wherein the outer geometric boundary encompasses a first area of the road network which is smaller than a second area of the road network including the inlets and outlets of the intersection, whereby the inlets and outlets reside outside of the outer geometric boundary;
generating an inner geometric boundary of the intersection that is different than the outer geometric boundary of the intersection and that surrounds a third area of the road network less than a total area within the intersection and being smaller than the first area of the road network which is defined by the certain lane segments of the conflict cluster, the inner geometric boundary being generated based on a second convex hull of (1) a first point on a centerline of a first lane segment in the conflict cluster which intersects a boundary line of a second lane segment in the conflict cluster at a first location, (2) a first auxiliary point located a distance from the first point in a first normal direction, (3) a second auxiliary point located a distance from the first point in a second normal direction, (4) a second point on the centerline of the first lane segment which intersects the boundary line of the second lane segment at a second different location, (5) a third auxiliary point located a distance from the second point in the first normal direction, and (6) a fourth auxiliary point located a distance from the second point in the second normal direction;

creating a data representation of the intersection that comprises:
an indication of the lane segments within the intersection;
an indication of the outer geometric boundary, and
an indication of the inner geometric boundary; and
adding the data representation to the road network map;
wherein identifying one or more conflicting lane segments from the plurality of lane segments that conflict with the lane segment comprises performing a breadth-first search or a depth-first search of the road network map.

2. The method of claim 1, wherein the plurality of lane segments include one or more of the following:
information identifying one or more lane segments that follow the lane segment in the road network map,
information identifying one or more lane segments that precede the lane segment in the road network map,
information identifying one or more lane segments that neighbor the lane segment in the road network map, or
information identifying one or more lane segments that conflict with the lane segment.

3. The method of claim 1, wherein identifying one or more conflicting lane segments from the plurality of lane segments that conflict with the lane segment comprises identifying one or more lane segments that intersect with or overlap the lane segment but do not originate from a same predecessor lane segment of the road network map as the lane segment.

4. The method of claim 1, wherein identifying one or more conflicting lane segments from the plurality of lane segments that conflict with the lane segment comprises analyzing metadata of the lane segment to determine if it includes an indication that the lane segment has conflicts.

5. The method of claim 1, wherein the outer geometric boundary comprises a polygon that represents an outer boundary of the intersection.

6. The method of claim 1, wherein the outer geometric boundary comprises a first polygon and the inner geometric boundary comprises a second polygon having dimensions smaller than the first polygon.

7. The method of claim 6, wherein the second polygon has at least one side overlapping a side of the first polygon.

8. A non-transitory computer-readable medium that stores instructions that is configured, when executed by at least one computing device, to cause the at least one computing device to perform operations comprising:

receiving a road network map that corresponds to a road network that is in an environment of the autonomous vehicle, wherein the road network map comprises a plurality of lane segments of the road network;
for each of the plurality of lane segments:
identifying one or more conflicting lane segments from the plurality of lane segments, each of which conflicts with the lane segment, and
adding conflict data pertaining to a conflict between the lane segment and the one or more conflicting lane segments to a set of conflict data;
analyzing the conflict data to identify a conflict cluster, wherein the conflict cluster comprises lane segments from the plurality of lane segments having related conflicts between or amongst them, wherein the conflict cluster is representative of an intersection;
for each lane segment in the conflict cluster, identifying a predecessor lane segment and a successor lane segment;
grouping the identified predecessor lane segments and the successor lane segments as inlets or outlets of the intersection;
generating an outer geometric boundary of the intersection based on a first convex hull of the lane segments in the conflict cluster, wherein the outer geometric boundary surrounds certain lane segments of the conflict cluster that define the intersection and that were not grouped as the inlets and outlets of the intersection, and wherein the outer geometric boundary encompasses a first area of the road network which is smaller than a second area of the road network including the inlets and outlets of the intersection, whereby the inlets and outlets reside outside of the outer geometric boundary;
generating an inner geometric boundary of the intersection that is different than the outer geometric boundary of the intersection and that surrounds a third area of the road network less than a total area within the intersection and being smaller than the first area of the road network which is defined by the certain lane segments of the conflict cluster, the inner geometric boundary being generated based on a second convex hull of (1) a first point on a centerline of a first lane segment in the conflict cluster which intersects a boundary line of a second lane segment in the conflict cluster at a first location, (2) a first auxiliary point located a distance from the first point in a first normal direction, (3) a second auxiliary point located a distance from the first point in a second normal direction, (4) a second point on the centerline of the first lane segment which intersects the boundary line of the second lane segment at a second different location, (5) a third auxiliary point located a distance from the second point in the first normal direction, and (6) a fourth auxiliary point located a distance from a second point in the second normal direction;
creating a data representation of the intersection that comprises: an indication of the lane segments within the intersection; an indication of the outer geometric boundary, and an indication of the inner geometric boundary; and
adding the data representation to the road network map;
wherein identifying one or more conflicting lane segments from the plurality of lane segments that conflict with the lane segment comprises performing a breadth-first search or a depth-first search of the road network map.

9. A system, comprising:
an electronic device of an autonomous vehicle; and
a computer-readable storage medium comprising one or more programming instructions that, when executed, cause the electronic device to:
  receive a road network map that corresponds to a road network that is in an environment of the autonomous vehicle, wherein the road network map comprises a plurality of lane segments of the road network;
  for each of the plurality of lane segments:
    identify one or more conflicting lane segments from the plurality of lane segments, each of which conflicts with the lane segment, and
    add conflict data pertaining to a conflict between the lane segment and the one or more conflicting lane segments to a set of conflict data;
  analyze the conflict data to identify a conflict cluster, wherein the conflict cluster comprises lane segments from the plurality of lane segments having related conflicts between or amongst them, wherein the conflict cluster is representative of an intersection;
  for each lane segment in the conflict cluster:
    identify a predecessor lane segment, and
    identify a successor lane segment;
  group the identified predecessor lane segments and the successor lane segments as inlets or outlets of the intersection;
  generate an outer geometric boundary of the intersection based on a first convex hull of the lane segments in the conflict cluster, wherein the outer geometric boundary surrounds certain lane segments of the conflict cluster that define the intersection and that were not grouped as the inlets and outlets of the intersection, and wherein the outer geometric boundary encompasses a first area of the road network which is smaller than a second area of the road network including the inlets and outlets of the intersection, whereby the inlets and outlets reside outside of the outer geometric boundary;
  generate an inner geometric boundary of the intersection that is different than the outer geometric boundary of the intersection and that surrounds a third area of the road network less than a total area within the intersection and being smaller than the first area of the road network which is defined by the certain lane segments of the conflict cluster, the inner geometric boundary being based on a second convex hull of (1) a first point on a centerline of a first lane segment in the conflict cluster which intersects a boundary line of a second lane segment in the conflict cluster at a first location, (2) a first auxiliary point located a distance from the first point in a first normal direction, (3) a second auxiliary point located a distance from the first point in a second normal direction, (4) a second point on the centerline of the first lane segment which intersects the boundary line of the second lane segment at a second different location, (5) a third auxiliary point located a distance from the second point in the first normal direction and (6) a fourth auxiliary point located a distance from the second point in the second normal direction;
  create a data representation of the intersection that comprises:
    an indication of the lane segments within the intersection;
    an indication of the outer geometric boundary, and
    an indication of the inner geometric boundary, and
  add the data representation to the road network map;
wherein the one or more programming instructions that, when executed, cause the electronic device to identify one or more conflicting lane segments from the plurality of lane segments that conflict with the lane segment comprises one or more programming instructions that, when executed, cause the electronic device to perform a breadth-first search or a depth-first search of the road network map.

10. The system of claim 9, wherein one or more of the lane segments include one or more of the following:
  information identifying one or more lane segments that follow the lane segment in the road network map,
  information identifying one or more lane segments that precede the lane segment in the road network map,
  information identifying one or more lane segments that neighbor the lane segment in the road network map, or
  information identifying one or more lane segments that conflict with the lane segment.

11. The system of claim 9, wherein the one or more programming instructions that, when executed, cause the electronic device to identify one or more conflicting lane segments from the plurality of lane segments that conflict with the lane segment comprises one or more programming instructions that, when executed, cause the electronic device to identify one or more lane segments that intersect with or overlap the lane segment but do not originate from a same predecessor lane segment of the road network map as the lane segment.

12. The system of claim 9, wherein the one or more programming instructions that, when executed, cause the electronic device to identify one or more conflicting lane segments from the plurality of lane segments that conflict with the lane segment comprises one or more programming instructions that, when executed, cause the electronic device to analyze metadata of the lane segment to determine if it includes an indication that the lane segment has conflicts.

13. The system of claim 9, wherein the outer geometric boundary comprises a polygon that represents an outer boundary of the intersection.

14. The system of claim 9, wherein the outer geometric boundary comprises a first polygon and the inner geometric boundary comprises a second polygon having dimensions smaller than the first polygon.

15. The system of claim 14, wherein the second polygon has at least one side overlapping a side of the first polygon.

* * * * *